United States Patent
Tajima (10) Patent No.: US 10,440,343 B2
(45) Date of Patent: Oct. 8, 2019

(54) IMAGE PROCESSING APPARATUS, IMAGE PROCESSING METHOD, AND STORAGE MEDIUM FOR PERFORMING TONE CONVERSION

(71) Applicant: CANON KABUSHIKI KAISHA, Tokyo (JP)

(72) Inventor: Kaori Tajima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/010,786

(22) Filed: Jun. 18, 2018

(65) Prior Publication Data

US 2018/0367780 A1 Dec. 20, 2018

(30) Foreign Application Priority Data

Jun. 19, 2017 (JP) .................. 2017-119885

(51) Int. Cl.
| | | |
|---|---|---|
| *H04N 11/20* | (2006.01) | |
| *H04N 9/64* | (2006.01) | |
| *H04N 9/78* | (2006.01) | |
| *H04N 9/68* | (2006.01) | |

(52) U.S. Cl.
CPC ............... *H04N 11/20* (2013.01); *H04N 9/64* (2013.01); *H04N 9/68* (2013.01); *H04N 9/78* (2013.01)

(58) Field of Classification Search
CPC . H04N 11/20; H04N 9/64; H04N 9/68; H04N 9/78
See application file for complete search history.

(56) References Cited

U.S. PATENT DOCUMENTS

| | | | |
|---|---|---|---|
| 6,480,300 B1 * | 11/2002 | Aoyama | ................. G06T 5/004 358/1.9 |
| 2018/0367781 A1 | 12/2018 | Tajima | |

FOREIGN PATENT DOCUMENTS

JP    3919389 B2    5/2007

* cited by examiner

*Primary Examiner* — Nicholas G Giles
(74) *Attorney, Agent, or Firm* — Carter, DeLuca & Farrell LLP (57) ABSTRACT

An image processing apparatus includes a separation unit that separates a high-frequency component and a low-frequency component, a first generation unit that generates a color signal component from the low-frequency component, a second generation unit that generates a color signal component from the low-frequency component, a third generation unit that generates a color signal component used in common for a luminance signal and a chrominance signal, a first tone conversion unit that performs first tone conversion processing on an output of the third generation unit, a color-and-luminance separation unit that generates a luminance signal and a chrominance signal, a second tone conversion unit that performs a second tone conversion on the high-frequency component, and a combining unit that combines outputs of the color-and-luminance separation unit and the second tone conversion unit.

20 Claims, 6 Drawing Sheets

IMAGE PROCESSING APPARATUS, IMAGE PROCESSING METHOD, AND STORAGE MEDIUM FOR PERFORMING TONE CONVERSION

BACKGROUND OF THE INVENTION

Field of the Invention

The present invention relates to a technique for converting the tone characteristics of captured image signals into tone characteristics suitable for outputting the image signals to an HDR monitor.

Description of the Related Art

In recent years, as the display luminance of displays are increasing, HDR (high dynamic range) camera systems that can regenerate a tone on a high-luminance side that is closer to that of an actual view have been proposed, the tone on a high-luminance side having been compressed so far. In addition, standards for a color space and tone compression of video signals that are handled by an HDR monitor, such as ST2084 and BT.2100, are being prescribed.

In the case of generating, in a camera, video signals adapted for an HDR standard, tone conversion is performed on an input image obtained via an optical system and an image sensor, so as to be adapted for the HDR standard, luminance signals and chrominance signals are then separated, and video signals are output. In an HDR monitor, upon receiving the video signals that have been output from the camera, conversion is performed into a color space for display processing such as RGB or XYZ, tone conversion on the monitor side that is adapted for the HDR standard is applied, and display is performed.

Conventionally, image processing that optimizes both output of colors and output of luminance in consideration of the human visual sense characteristics has been suggested as processing on the camera side (Japanese Patent No. 3919389).

In an image processing apparatus disclosed in Japanese Patent No. 3919389, signal processing for chrominance signal output (color-related signal processing) and signal processing for luminance output (luminance-related signal processing) are optimized. Therefore, there are cases where a difference in amplitude level between luminance components that are separated from an input image in color-related signal processing and luminance components that are generated from the input image in luminance-related signal processing occurs. In particular, in tone conversion characteristics adapted for an HDR standard such as ST2084, rise in a dark portion is steep, and thus there are cases where a difference in amplitude level of luminance components is emphasized by performing tone conversion. As a result, when converting video signals that are output from a camera into a color space for display on an HDR monitor, there is an issue that false signals are generated in the color space for display due to the difference in luminance amplitude level that occurred in the camera, and the image quality is deteriorated significantly.

SUMMARY OF THE INVENTION

The present invention has been made in light of the above-described issue, and provides an image processing apparatus that can suppress an increase in amplitude level difference of luminance components when performing tone conversion processing optimized for both luminance and colors.

According to a first aspect of the present invention, there is provided an image processing apparatus comprising: a separation unit configured to separate a high-frequency component and a low-frequency component from an input image signal; a first generation unit configured to generate a color signal component for a luminance signal from the low-frequency component; a second generation unit configured to generate a color signal component for a chrominance signal from the low-frequency component; a third generation unit configured to generate a color signal component used in common for a luminance signal and a chrominance signal by combining an output of the first generation unit and an output of the second generation unit; a first tone conversion unit configured to perform first tone conversion processing on an output of the third generation unit; a color-and-luminance separation unit configured to generate a luminance signal and a chrominance signal from a signal after being processed by the first tone conversion unit; a second tone conversion unit configured to perform a second tone conversion on the high-frequency component; and a combining unit configured to combine an output of the color-and-luminance separation unit and an output of the second tone conversion unit.

According to a second aspect of the present invention, there is provided an image processing apparatus comprising: a separation unit configured to separate a high-frequency component and a low-frequency component from an input image signal; a first generation unit configured to generate a color signal component for a luminance signal from the low-frequency component; a second generation unit configured to generate a color signal component for a chrominance signal from the low-frequency component; a third tone conversion unit configured to perform third tone conversion processing on the color signal component for a luminance signal; a fourth tone conversion unit configured to perform fourth tone conversion processing on the color signal component for a chrominance signal; a third generation unit configured to generate a color signal component used in common for a luminance signal and a chrominance signal by combining an output of the third tone conversion unit and an output of the fourth tone conversion unit; a first tone conversion unit configured to perform first tone conversion processing on an output of the third generation unit; a color-and-luminance separation unit configured to generate a luminance signal and a chrominance signal from a signal after being processed by the first tone conversion unit; a second tone conversion unit configured to perform a second tone conversion on the high-frequency component; and a combining unit configured to combine an output of the color-and-luminance separation unit and an output of the second tone conversion unit.

According to a third aspect of the present invention, there is provided an image processing method comprising: separating a high-frequency component and a low-frequency component from an input image signal; executing a first generation for generating a color signal component for a luminance signal from the low-frequency component; executing a second generation for generating a color signal component for a chrominance signal from the low-frequency component; executing a third generation for generating a color signal component used in common for a luminance signal and a chrominance signal by combining an output of the first generation and an output of the second generation; performing a first tone conversion on an output of the third generation; executing color-and-luminance separation for generating a luminance signal and a chrominance signal from a signal after being processed in the first tone conversion; performing a second tone conversion on the high-frequency component; and combining an output of the color-and-luminance separation and an output of the second tone conversion.

According to a fourth aspect of the present invention, there is provided an image processing method comprising: separating a high-frequency component and a low-frequency component from an input image signal; executing a first generation for generating a color signal component for a luminance signal from the low-frequency component; executing a second generation for generating a color signal component for a chrominance signal from the low-frequency component; performing a third tone conversion on the color signal component for a luminance signal; performing a fourth tone conversion on the color signal component for a chrominance signal; executing a third generation for generating a color signal component used in common for a luminance signal and a chrominance signal by combining an output of the third tone conversion and an output of the fourth tone conversion; performing first tone conversion processing on an output of the third generation; executing color-and-luminance separation for generating a luminance signal and a chrominance signal from a signal after being processed in the first tone conversion; performing a second tone conversion on the high-frequency component; and combining an output of the color-and-luminance separation and an output of the second tone conversion.

Further features of the present invention will become apparent from the following description of exemplary embodiments with reference to the attached drawings.

DESCRIPTION OF THE EMBODIMENTS

Embodiments of the present invention will be described below in detail with reference to the attached drawings.

First Embodiment

Figure 1:
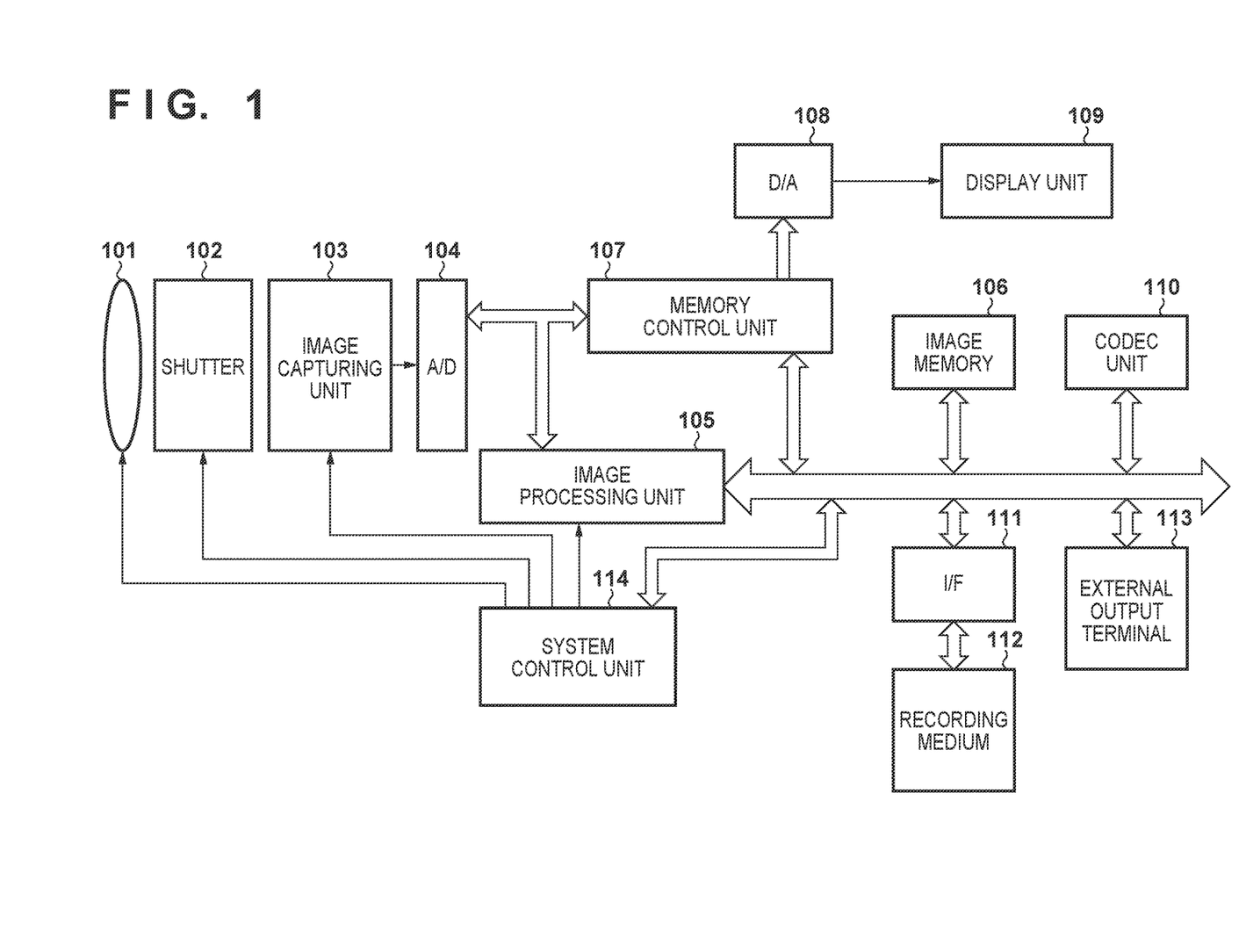
FIG. 1 is a block diagram showing the configuration of a digital camera that is a first embodiment of an image processing apparatus of the present invention.

FIG. 1 is a block diagram showing an exemplary configuration of a digital camera that is a first embodiment of an image processing apparatus of the present invention.

In FIG. 1, a lens group 101 includes a zoom lens and a focus lens, and forms a subject image. A shutter 102 has a function for opening/closing a light path and a diaphragm function. An image capturing unit 103 is constituted by a CMOS image sensor or the like, and converts an optical image into electrical signals. An A/D converter 104 converts analog image signals that are output from the image capturing unit 103 into digital image signals. An image processing unit 105 performs, on image data that has been output from the A/D converter 104, various types of image processing such as white balance processing, demosaic processing, noise reduction processing, contour emphasis processing, tone conversion processing, and color correction processing. An image memory 106 temporarily stores image data. A memory control unit 107 controls input/output of image data to/from the image memory 106. The D/A converter 108 converts digital signals that have been input, into analog signals. A display unit 109 is constituted by an LCD or the like, and displays image data that has been output from the D/A converter 108, and the like. A codec unit 110 performs compression encoding/decoding on image data.

A recording medium 112 is constituted by a memory card, a hard disk, or the like, and stores image data. An interface 111 is an interface for outputting video signals to the recording medium 112. An external output terminal 113 outputs video signals generated by the digital camera of this embodiment to an external device connect to this digital camera, such as an HDR (high dynamic range) monitor or the like. A system control unit 114 controls the entire system of the digital camera.

Next, basic operations in a digital camera configured as described above will be described. The image capturing unit 103 photoelectrically converts light that is incident via the lens group 101 and the shutter 102, and outputs generated image signals as input image signals to the A/D converter 104. The A/D converter 104 converts the analog image signals that are output from the image capturing unit 103 into digital image signals, and outputs the digital image signals to the image processing unit 105.

The image processing unit 105 processes image data that has been output from the A/D converter 104, or image data that has been output from the memory control unit 107, and generates video signals to be output to the codec unit 110 and the external output terminal 113. Image data that has been output from the image processing unit 105 is written to the image memory 106 via the memory control unit 107. The image memory 106 stores image data that has been output from the A/D converter 104 and image data to be displayed on the display unit 109.

In addition, the D/A converter 108 converts, into analog signals, image data that is stored in the image memory 106, and is to be displayed, and supplies the analog signals to the display unit 109. The display unit 109 performs display that is based on the analog signals that have been output from the D/A converter 108, on a display device such as an LCD. The codec unit 110 performs compression coding on image data stored in the image memory 106. The system control unit 114 stores encoded image data to a recording medium via the interface 111. The system control unit 114 also outputs video signals that are output from the image memory 106, the image processing unit 105, or the codec unit 110, to an external output device such as an HDR monitor via the external output terminal 113.

Figure 2:
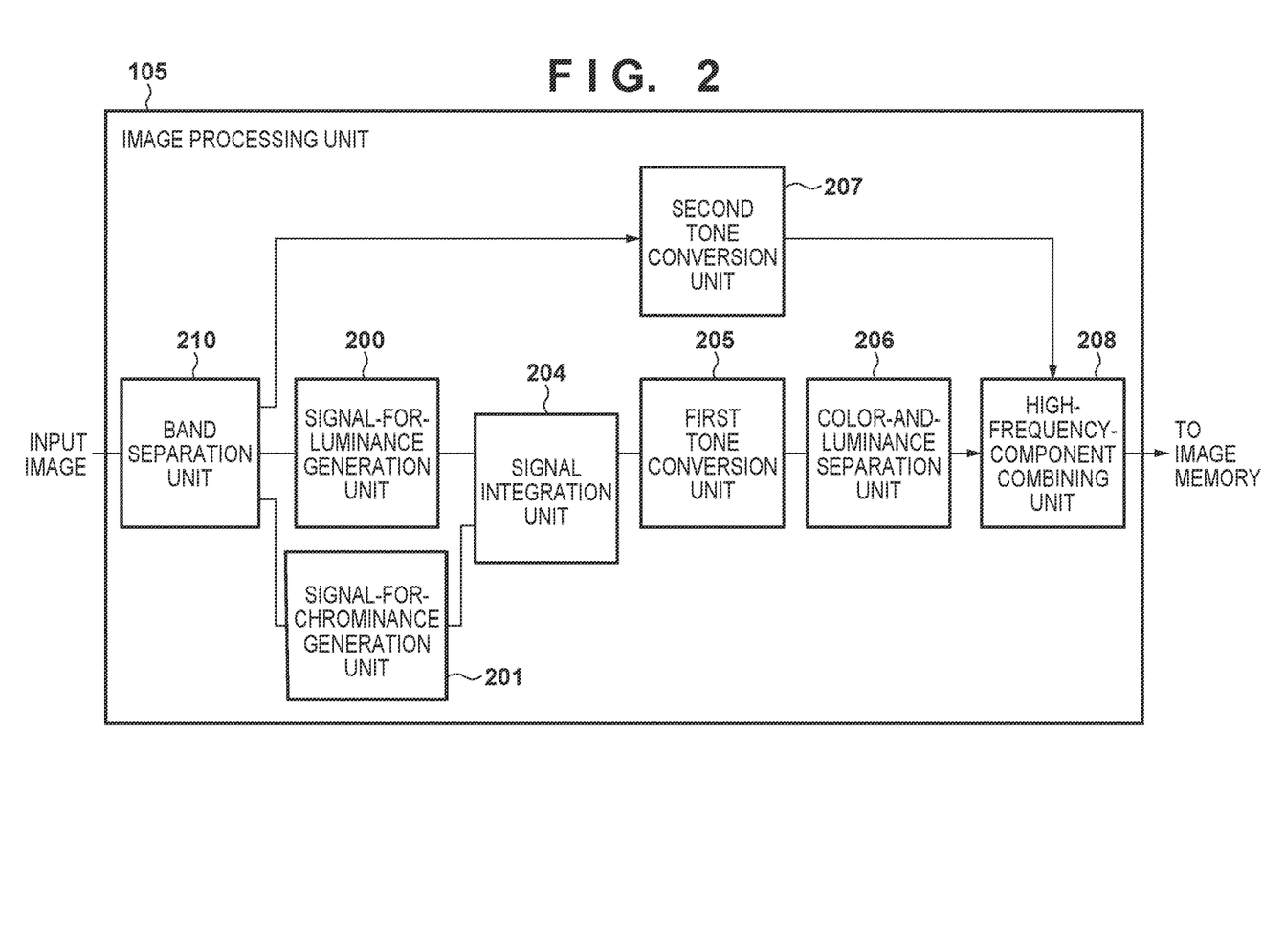
FIG. 2 is a block diagram showing the configuration of the image processing unit in the first embodiment.

Next, FIG. 2 is a diagram showing the configuration of the image processing unit 105. In FIG. 2, a band separation unit 210 separates high-frequency components, low-frequency components for luminance, and low-frequency components for colors from an input image. A signal-for-luminance generation unit 200 generates RGB signal components (color signal components) suitable for low-frequency luminance signals, from the low-frequency components for luminance that are output from the band separation unit 210. A signal-for-chrominance generation unit 201 generates RGB signal components (color signal components) suitable for low-frequency chrominance signal, from the low-frequency components for colors that are output from the band separation unit 210.

Outputs of the signal-for-luminance generation unit 200 and the signal-for-chrominance generation unit 201 are input to a signal integration unit 204. The signal integration unit 204 integrates (combines) the two types of RGB signals for a luminance signal and a chrominance signal that are respectively output from the signal-for-luminance generation unit 200 and the signal-for-chrominance generation unit 201, and generates one type of RGB signals Rmix, Gmix, and Bmix. Expressions 1 to 3 are expressions indicating calculations that are performed by the signal integration unit 204.

$$Rmix=R1c+a*(R1y-R1c)+b*(G1y-G1c)+c*(B1y-B1c) \quad (1)$$

$$Gmix=G1c+a*(R1y-R1c)+b*(G1y-G1c)+c*(B1y-B1c) \quad (2)$$

$$Bmix=B1c+a*(R1y-R1c)+b*(G1y-G1c)+c*(B1y-B1c) \quad (3)$$

Here, in Expressions 1 to 3, R1y, G1y, and B1y are RGB signals that are output from the signal-for-luminance generation unit 200, and R1c, G1c, and B1c are RGB signals that are output from the signal-for-chrominance generation unit 201. Also, a, b, and c are any coefficients, and satisfy a+b+c=1.

Output of the signal integration unit 204 is input to a first tone conversion unit 205. The first tone conversion unit 205 performs a first tone conversion on the RGB signals Rmix, Gmix, and Bmix that have been output from the signal integration unit 204. In the first tone conversion, output signals R1', G1', and B1' are generated using Expressions 4 to 6. Here, letting that input is x, output is y, and a differential coefficient of conversion characteristics is f1(x), conversion processing that is performed by the first tone conversion unit 205 can be expressed as y=x*f1(x).

$$R1'=Rmix*f1(Rmix) \quad (4)$$

$$G1'=Gmix*f1(Gmix) \quad (5)$$

$$B1'=Bmix*f1(Bmix) \quad (6)$$

Output of the first tone conversion unit 205 is input to a color-and-luminance separation unit 206. The color-and-luminance separation unit 206 separates a luminance signal Y (luminance signal components) and chrominance signals U and V (chrominance signal components) from the RGB signals that have been output from the first tone conversion unit 205, using Expressions 7 to 9. Note that, in Expressions 7 to 9, a1, b1, and c1 are any coefficients, and satisfy a1+b1+c1=1.

$$Y=a1*R1'+b1*G1'+c1*B1' \quad (7)$$

$$U=(1-c1)*B1'-a1*R1'-b1*G1' \quad (8)$$

$$V=(1-a1)*R1'-c1*B1'-b1*G1' \quad (9)$$

Here, a human visual sense system has a characteristic of responding, up to a higher spatial frequency, to a change in brightness than a color. Therefore, the signal-for-luminance generation unit 200 performs demosaic processing, noise reduction processing, contour compensation processing, and the like on image data that has been output from the A/D converter 104, so as to include a large amount of high-frequency components. On the other hand, the signal-for-chrominance generation unit 201 performs demosaic processing, noise reduction processing, color correction processing, and the like on image data that has been output from the A/D converter 104 such that an image quality deterioration due to high-frequency components, such as noise and aliasing that is caused by image processing is reduced as much as possible. Therefore, there are cases where a band difference occurs between RGB signals generated by the signal-for-luminance generation unit 200 and RGB signals generated by the signal-for-chrominance generation unit 201. If a band difference occurs in RGB signals in this manner, there are cases where, due to high-frequency components included in luminance-related RGB signals, in processing of the signal integration unit 204, false signals, which were not included in the original signals, are generated in RGB signals after integration, deteriorating the image quality significantly.

In view of this, in this embodiment, high-frequency components, low-frequency components for luminance, and low-frequency components for colors are separated by the band separation unit 210, and the separated low-frequency components are input to the signal-for-luminance generation unit 200 and the signal-for-chrominance generation unit 201. Accordingly, the frequency bands of RGB signals for luminance signals and RGB signals for chrominance signals are matched.

For example, as processing for adjusting the frequency bands, processing of a low-pass filter is performed through calculation shown in Expression 10 by referencing a pixel of interest p(i, j) and pixels in the vicinity of the pixel of interest in an input image.

$$p\_out(i,j)=\{k1*p(i-1,j-1)+k2*p(i,j-1)+k3*p(i+1,j-1)+k4*p(i-1,j)+k5*p(i,j)+k6*p(i+i,j)+k7*p(i-1,j+1)+k8*p(i,j+1)+k9*p(i+1,j+1)\}/M \quad (10)$$

In Expression 10, i and j respectively indicate the pixel positions of the pixel of interest in the input image in the row direction and the column direction, and satisfy M=k1+k2+k3+k4+k5+k6+k7+k8+k9. k1, k2, k3, k4, k5, k6, k7, k8, and k9 are filter coefficients for a reference pixel.

Figure 3:
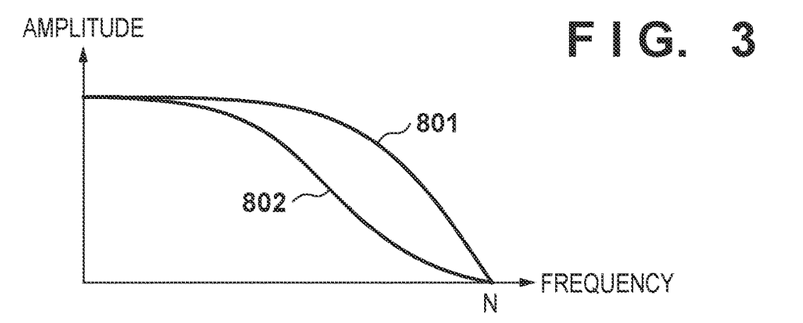
FIG. 3 is a diagram showing frequency amplitude characteristics desired to be achieved for luminance signals and chrominance signals in the first embodiment.

For example, assume that the frequency amplitude characteristic desired to be achieved for a final luminance signal is a characteristic indicated by reference numeral 801 in FIG. 3, and the frequency amplitude characteristic desired to be achieved for final chrominance signals is a characteristic as indicted by a curve 802 in FIG. 3. In this case, the above-described filter coefficients are adjusted such that RGB signals for a low-frequency luminance signal and RGB signals for chrominance signals have the frequency amplitude characteristic as indicated by the curve 802 in FIG. 3.

Accordingly, in Expressions 1 to 3, the components of the second term onward take 0, and thus, after the RGB signals are integrated by the signal integration unit 204, the level difference caused by the difference between luminance-related processing and color-related processing is eliminated, and it becomes possible to prevent an image quality deterioration.

Figure 4:
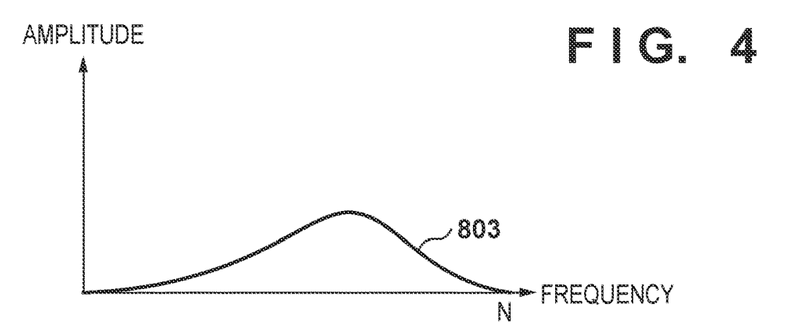
FIG. 4 is a diagram showing frequency amplitude characteristics of high-frequency components separated by a band separation unit in the first embodiment.

On the other hand, the band separation unit 210 separates high-frequency components from an input image according to a frequency amplitude characteristic as indicated by a curve 803 in FIG. 4. This characteristic includes the difference between a frequency amplitude characteristic that corresponds to the curve 801 in FIG. 3, and is desired to be achieved as a final luminance signal and a frequency amplitude characteristic that corresponds to the curve 802 in FIG. 3, and is desired to be achieved as final chrominance signals. Note that, in FIGS. 3 and 4, N indicates a Nyquist frequency.

Note that high-frequency components separated by the band separation unit 210 are subjected to tone conversion that is performed by a second tone conversion unit 207. The second tone conversion unit 207 performs tone conversion according to characteristics different from that of the first tone conversion unit 205. Specifically, the second tone conversion unit 207 performs tone conversion according to characteristics in which the non-linearity is relatively low compared with the first tone conversion unit 205. For example, letting that input is Y_ac, output is Y_ac', and the gain of conversion characteristics is f2(Yy), conversion processing that is performed by the second tone conversion unit 207 is expressed as Expressions 11 to 13. Note that, in Expressions 11 to 13, a2, b2, and c2 are any coefficients, and satisfy a2+b2+c2=1.

$$Y\_ac' = Y\_ac * f2(Yy) \quad (11)$$

$$Y\_ac = a2*(R1y-R1c)+b2*(G1y-G1c)+c*(B1y-B1c) \quad (12)$$

$$Yy = a2*R1y+b2*G1y+c2*B1y \quad (13)$$

Accordingly, a gain f2(Yy) that serves as conversion characteristics of tone conversion is determined by referencing a luminance Yy obtained from the RGB signals for luminance R1y, G1y, and B1y. The second tone conversion unit 207 then performs tone conversion so as to adjust the amplitude level of the high-frequency luminance signals Y_ac using the gain.

Output of the second tone conversion unit 207 is combined, by a high-frequency-component combining unit 208, with a luminance signal after being separated by the color-and-luminance separation unit 206, and the high-frequency-component combining unit 208 outputs a final luminance signal Y_out and chrominance signals U_out and V_out. In the high-frequency-component combining unit 208, calculations as in Expressions 14 to 16 are performed using the results of Expressions 7 to 9 and Expression 10.

$$Y\_out = Y + Y\_ac' \quad (14)$$

$$U\_out = U \quad (15)$$

$$V\_out = V \quad (16)$$

The luminance signal and chrominance signals that have been output from the high-frequency-component combining unit 208 are output from the external output terminal 113 via the image memory 106 or the codec unit 110, and are input to the HDR monitor.

The luminance signal and chrominance signals of Expressions 14 to 16 are converted into RGB signals and are displayed on the HDR monitor. This conversion is inverse conversion of Expressions 7 to 9, and thus the high-frequency components Y_ac' included in Expression 14 are distributed to the RGB signals acquired through the conversion in the monitor. Therefore, there are cases where noise of Y_ac' and false signals included when generating Y_ac are significantly amplified by the second tone conversion unit 207, and the image quality deteriorates at the time of monitor display.

Thus, in this embodiment, regarding low-frequency components that affect brightness and saturation at the time of monitor display, conversion is performed according to tone conversion characteristics in which the non-linearity is high, such that desired brightness and saturation are regenerated. On the other hand, regarding high-frequency components that are difficult to separate from noise, tone conversion is performed according to characteristics in which the non-linearity is lower than the first tone conversion unit, in consideration of the balance with a feeling of tone.

Next, FIGS. 5, 6, 7, and 8 are diagrams for describing characteristics and actions of the first tone conversion unit 205 and the second tone conversion unit 207.

Figure 5:
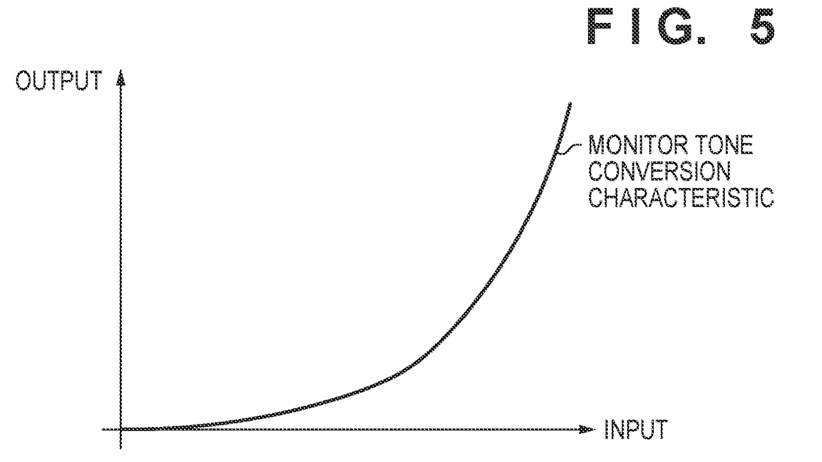
FIG. 5 is a diagram showing a feature of tone conversion characteristics (EOTF characteristics) of an HDR monitor.
Figure 6:
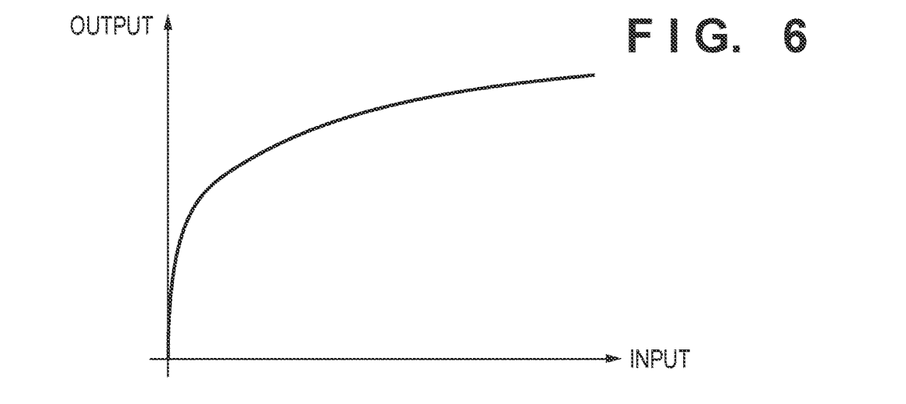
FIG. 6 is a diagram showing a feature of tone conversion characteristics (inverted-EOTF characteristics) of an HDR monitor.

On a monitor adapted for an HDR (high dynamic range), the correspondence relationship between the quantization level and the display luminance of video signals is prescribed as an EOTF (Electro Optical Transfer Function) in order to regenerate the luminance of a scene with a wide dynamic range (D-range) so as to reduce deterioration as much as possible. In addition, the input/output characteristic of the monitor is as shown in FIG. 5, for example. Therefore, on the camera side, an input image obtained by the image capturing unit 103 is subjected to tone conversion according to the inverse-characteristic of the above EOTF (a target curve aimed to be achieved) as shown in FIG. 6, and video signals (output image signals) are output to the monitor. This makes it possible to regenerate the luminance of a scene having a wide dynamic range, as luminance on the monitor. Here, in the case of performing tone conversion according to the input/output characteristic as shown in FIG. 6, a differential coefficient of a tone conversion characteristic is as shown in FIG. 7, and in a region 500 in which the level of an input signal is low, the input signal is amplified with a relatively higher differential coefficient compared with a region in which an input signal level is high.

If there is a difference between color-related and luminance-related RGB signal bands before integration is performed by the signal integration unit 204, there are cases where the difference between signal bands is emphasized through the first tone conversion performed by the first tone conversion unit 205, and propagates to other color signals. However, in this embodiment, the signal band of RGB signals in the signal-for-luminance generation unit 200 and the signal band of RGB signals in the signal-for-chrominance generation unit 201 are matched. Therefore, in the first tone conversion, even if tone conversion is performed so as to modulate the amplitude using a differential coefficient as shown in FIG. 7, the image quality does not deteriorate.

Figure 7:
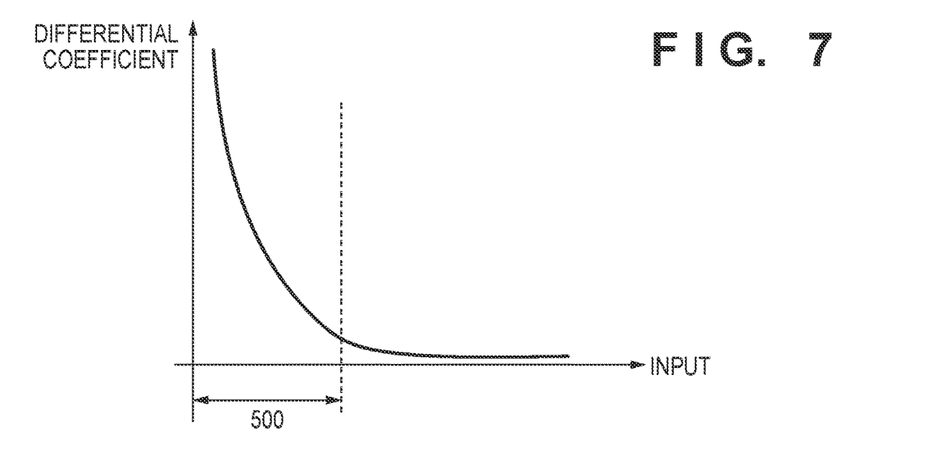
FIG. 7 is a diagram showing a differential coefficient of a curve in FIG. 6.

On the other hand, the second tone conversion unit 207 performs tone conversion processing on high-frequency components, and thus, regarding the differential coefficient shown in FIG. 7, the degree of the differential coefficient that is applied to signals on a low-luminance side is suppressed so as to not emphasize noise. Accordingly, tone conversion is performed such that the amplitude of input is modulated according to a characteristic indicated by a curve (or a line)

Figure 8:
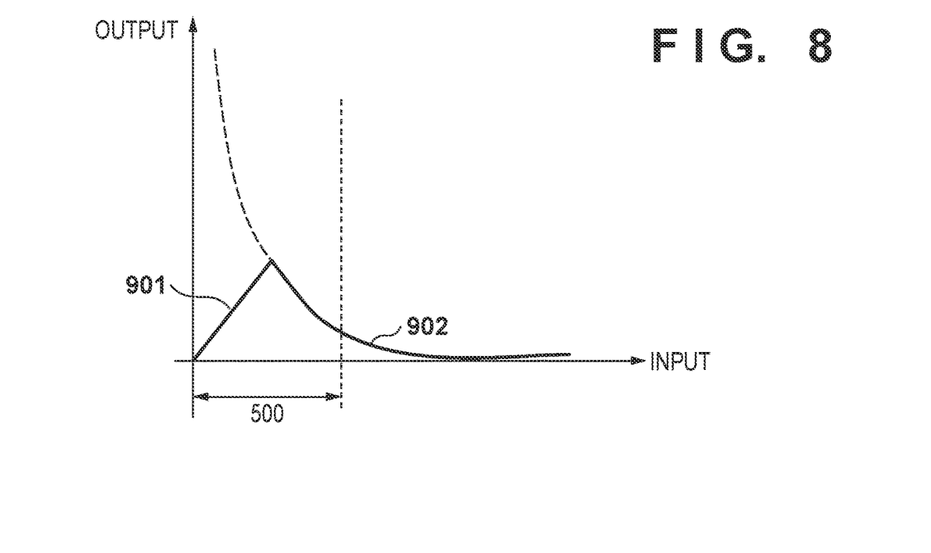
FIG. 8 is a diagram for describing the characteristics of a second tone conversion unit.

901 shown in FIG. 8. Note that the characteristic of the curve 901 in FIG. 8 is adjusted in consideration of the balance between a feeling of tone of high-frequency components of the subject and noise.

As described above, in this embodiment, when performing image processing optimum for both luminance and chrominance on a linear input image obtained by an image capturing unit, frequency bands are separated. The first tone conversion and second tone conversion are then combined, and tone conversion according to the inverse-characteristic of an EOTF adapted for an HDR monitor is performed. Accordingly, without emphasizing, through tone conversion, false signals generated due to the difference between signal processing for luminance and signal processing for chrominance, the luminance of a scene obtained by an image capturing unit can be regenerated as luminance on the HDR monitor.

Note that, in this embodiment, RGB is used as a color space for the first and second tone conversion units to perform tone conversion, but conversion processing may be performed using a color space of another color mixing system/color system such as XYZ or LMS.

Second Embodiment

A digital camera that is a second embodiment of the image processing apparatus of the present invention will be described below. In appearance, this digital camera of the second embodiment is the same as the digital camera of the first embodiment shown in FIG. 1, and only the configuration of an image processing unit 105 is different from the first embodiment. Only this difference from the first embodiment will be described below.

Figure 9:
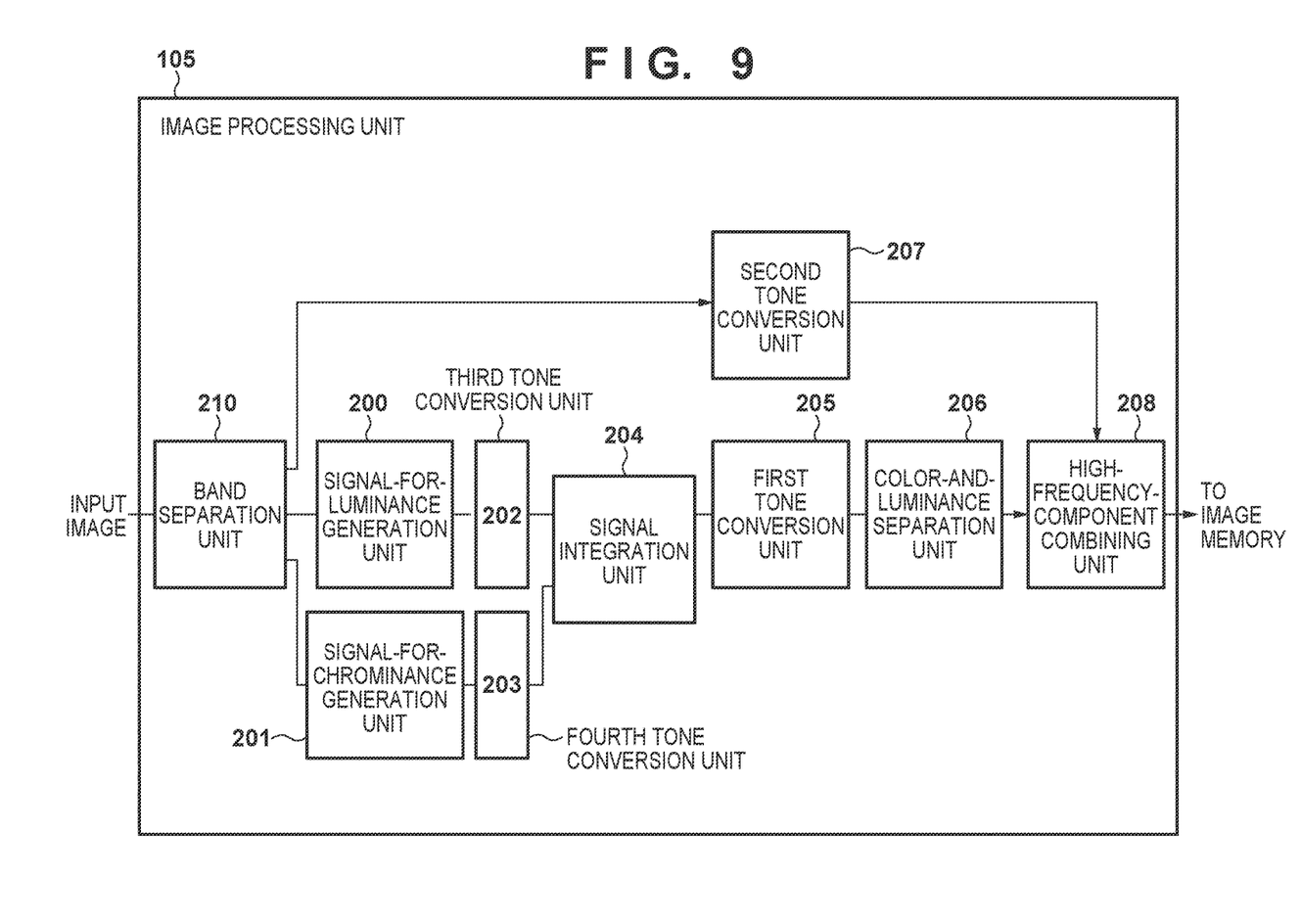
FIG. 9 is a block diagram showing the configuration of an image processing unit in a second embodiment.

FIG. 9 is a diagram showing the configuration of the image processing unit 105 in the second embodiment. The same numeral references are assigned to constituent elements that perform the same actions as those of the first embodiment, and a description thereof is omitted.

In FIG. 9, a band separation unit 210 separates an input image into high-frequency components, low-frequency components for luminance, and low-frequency components for colors. A signal-for-luminance generation unit 200 generates RGB signal components (color signal components) suitable for a low-frequency luminance signal, from the low-frequency components for luminance that have been output from the band separation unit 210. A signal-for-chrominance generation unit 201 generates RGB signal components (color signal components) suitable for low-frequency chrominance signals, from the low-frequency components for colors that have been output from the band separation unit 210.

A third tone conversion unit 202 performs a third tone conversion on output of the signal-for-luminance generation unit 200. In addition, a fourth tone conversion unit 203 performs fourth tone conversion on output of the signal-for-chrominance generation unit 201.

Outputs of the third tone conversion unit 202 and the fourth tone conversion unit 203 are input to a signal integration unit 204. The signal integration unit 204 integrates (combines) the two types of RGB signals for a luminance signal and a chrominance signal that have been output from the third tone conversion unit 202 and the fourth tone conversion unit 203, and generates one type of RGB signals Rmix, Gmix and Bmix.

Output of the integration unit 204 is input to a first tone conversion unit 205. The first tone conversion unit 205 performs the first tone conversion on the RGB signals Rmix, Gmix, and Bmix that have been output from the signal integration unit 204. Output of the first tone conversion unit 205 is input to a color-and-luminance separation unit 206. The color-and-luminance separation unit 206 separates a luminance signal Y (luminance signal component), and chrominance signals U and V (chrominance signal components) from the RGB signals that have been output from the first tone conversion unit 205, using Expressions 7 to 9.

On the other hand, high-frequency components separated by the band separation unit 210 are subjected to tone conversion in a second tone conversion unit 207. A high-frequency component combining unit 208 combines output of the second tone conversion unit 207 to a luminance signal separated by the color-and-luminance separation unit 206, and outputs a final luminance signal Y_out, chrominance signals U_out and V_out. The luminance signal and chrominance signals that are output from the high-frequency component combining unit 208 are output from an external output terminal 113 via an image memory 106 or a codec unit 110, and are input to an HDR monitor.

In this second embodiment, high-frequency components, low-frequency components for luminance, and low-frequency components for colors are separated by the band separation unit 210, and after being subjected to tone conversion, are input to the signal integration unit 204. However, the frequency band of RGB signals for a luminance signal and the frequency band of RGB signals for chrominance signals are not matched completely.

Figure 10:
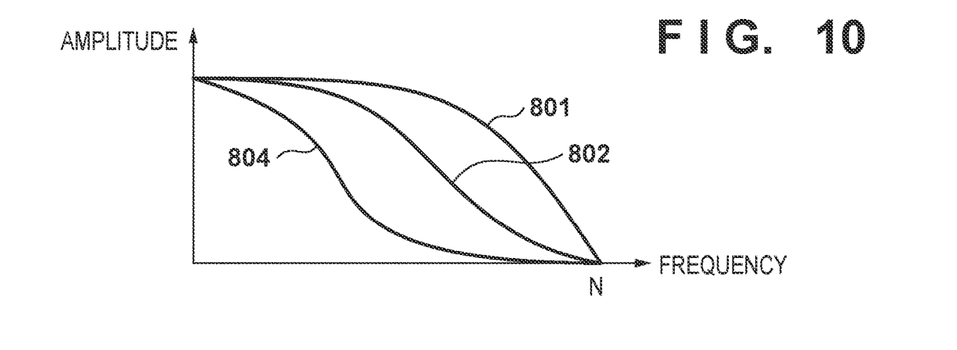
FIG. 10 is a diagram showing frequency amplitude characteristics desired to be achieved for luminance signals and chrominance signals in the second embodiment.

For example, assume that a characteristic indicated by a curve 801 in FIG. 10 is a frequency amplitude characteristic desired to be achieved as a final luminance signal, and a characteristic indicated by a curve 804 is a frequency amplitude characteristic desired to be achieved as final chrominance signals. In this case, bands are separated such that the frequency amplitude characteristic of RGB signal components for a low-frequency luminance signal matches the characteristic indicated by the curve 802.

This is because of the following reason. In the case where the difference between a frequency amplitude characteristic desired to be finally achieved for a luminance signal and a frequency amplitude characteristic desired to be finally achieved for chrominance signals is large, if the band of the RGB signals for a low-frequency luminance signal is matched with the band of the RGB signals for chrominance signals, the ratio of signals that are replaced by high-frequency components of luminance increases in the high-frequency-component combining unit 208. In this case, a problem may occur in that color omission of an edge occurs in a high-saturation subject.

On the other hand, since the frequency bands of the RGB signals for chrominances and the RGB signals for a low-frequency luminance signal are not matched, if these two types of RGB signals are combined by the signal integration unit 204, there are cases where false signals, which were not included in the original color signals, are generated. In view of this, in this embodiment, the third tone conversion and fourth tone conversions are respectively performed by the third tone conversion unit 202 and the fourth tone conversion unit 203. The difference in signal level caused by the difference in frequency band between the RGB signals for chrominance and the RGB signals for a low-frequency luminance signal is then reduced, and, after that, the signal integration unit 204 integrates the above-described two types of RGB signals. Note that the third tone conversion unit 202 and the fourth tone conversion unit 203 may perform tone conversion processing of the same characteristics, or may perform tone conversion processing of different characteristics, and, in this embodiment, tone conversion processing of the same characteristics is performed.

Figure 11:
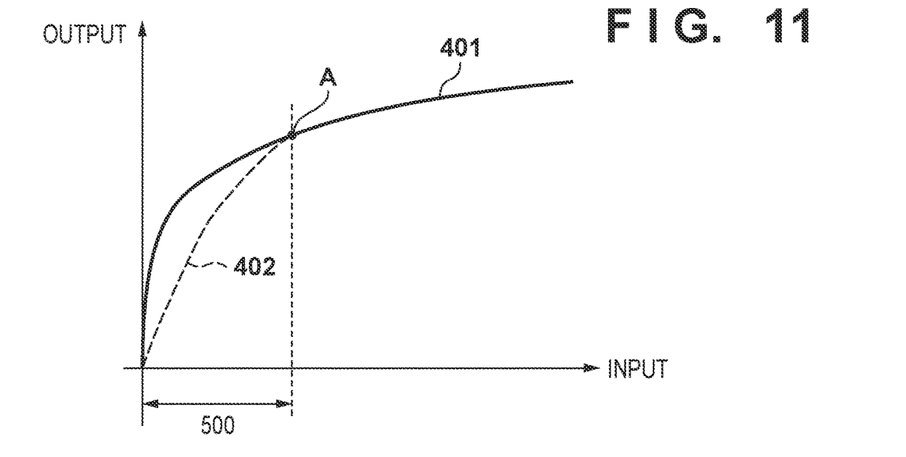
FIG. 11 is a diagram for describing the characteristics of third and fourth tone conversion units in the second embodiment.

In addition, for example, the third and fourth tone conversion units 202 and 203 perform tone conversion using Expression 17 to 22, so as to achieve a characteristic indicated by a curve 402, in a region indicated by reference numeral 500 in FIG. 11 in which a high differential coefficient is applied.

Here, when the third tone conversion unit 202 and the fourth tone conversion unit 203 perform tone conversion of the same characteristics, letting that input is x, output is y, and a differential coefficient of the conversion characteristics is f3(x), the tone conversion processing can be expressed as y=x*f3(x). Here, Ry, Gy, and Cy are outputs of the signal-for-luminance generation unit 200, and Rc, Gc, and Bc are outputs of the signal-for-chrominance generation unit 201. R3y', G3y', and B3y' are outputs of the third tone conversion unit 202, and R3c', G3c', and B3c' are outputs of the fourth tone conversion unit 203.

$$R3c'=Rc*f3(Rc) \quad (17)$$

$$R3y'=Ry*f3(Ry) \quad (18)$$

$$G3c'=Gc*f3(Gc) \quad (19)$$

$$G3y'=Gy*f3(Gy) \quad (20)$$

$$B3c'=Bc*f3(Bc) \quad (21)$$

$$B3y'=By*f3(By) \quad (22)$$

Outputs of the third tone conversion unit 202 and outputs of the fourth tone conversion unit 203 are input to the signal integration unit 204. The signal integration unit 204 integrates (combines) two types of RGB signals for a luminance signal and chrominance signals that have been output from the third tone conversion unit 202 and the fourth tone conversion unit 203, and generates one type of RGB signals Rmix, Gmix, and Bmix. Expressions 23 to 25 are expressions indicating calculations that are performed by the signal integration unit 204.

$$Rmix=R3c'+a3*(R3y'-R3c')+b3*(G3y'-G3c')+c3*(B3y'-B3c') \quad (23)$$

$$Gmix=G1c'+a3*(R3y'-R3c')+b3*(G3y'-G3c')+c3*(B3y'-B3c') \quad (24)$$

$$Bmix=B1c'+a3*(R3y'-R3c')+b3*(G3y'-G3c')+c3*(B3y'-B3c') \quad (25)$$

Note that, in Expressions 23 to 25, a3, b3, and c3 are any coefficient, and satisfy a3+b3+c3=1.

In Expressions 23 to 25, the amplitude levels of the components of the second term onward are reduced by the third and fourth tone conversion units 202 and 203. Note that, as described already, the characteristics of tone conversion performed by the third tone conversion unit 202 and fourth tone conversion unit 203 may be common, or may be different within a range in which the difference in amplitude level between the two types of RGB signals after tone conversion is allowable.

Outputs of the third tone conversion unit 202 and outputs of the fourth tone conversion unit 203 are input to the signal integration unit 204. The signal integration unit 204 integrates (combines) the two types of RGB signals for a luminance signal and chrominance signals that have been output from the third tone conversion unit 202 and the fourth tone conversion unit 203, and generates one type of RGB signals Rmix, Gmix, and Bmix.

Figure 12:
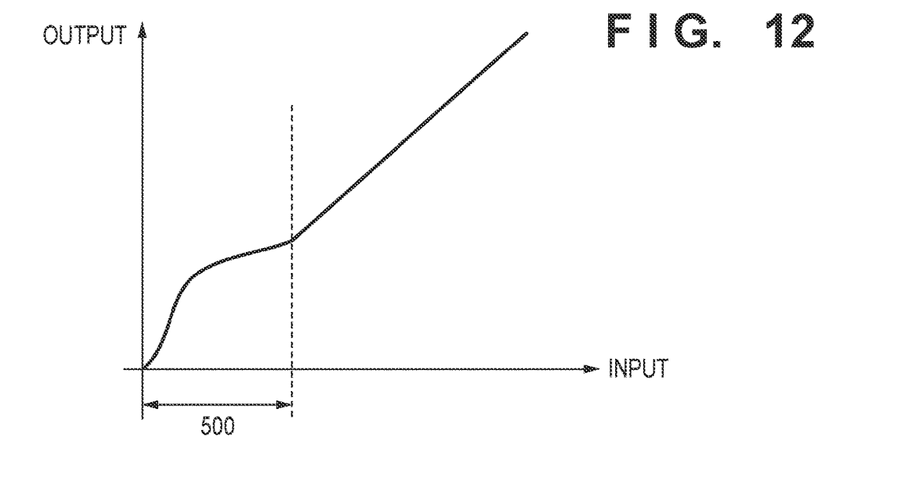
FIG. 12 is a diagram for describing the characteristics of a first tone conversion unit in the second embodiment.

Outputs of the signal integration unit 204 are input to the first tone conversion unit 205. The first tone conversion unit 205 performs the first tone conversion on the RGB signals Rmix, Gmix, and Bmix that have been output from the signal integration unit 204, using Expressions 4 to 6. In the second embodiment, letting that input is x, and output is f1(x), a differential coefficient f1(x) of the conversion characteristics in Expressions 4 to 6 results in an input/output characteristic as shown in FIG. 12. In FIG. 12, a region indicated by reference numeral 500 corresponds to the region indicated by reference numeral 500 in FIG. 11. The amplitude level of the output signal level of the region indicated by reference numeral 500 in FIG. 11 is lower than the inverse-characteristic of the EOTF adapted for the HDR monitor, as indicated by a curve 402. Therefore, in the first tone conversion, tone conversion of the characteristic as shown in FIG. 12 in which f1(x) is used is performed such that the amplitude level that is reduced in third and fourth tone conversions is amplified.

In this embodiment, as described above, the inverse-characteristic of the EOTF adapted for an HDR monitor is applied, in two stages, to the third and fourth tone conversion units 202 and 203 for a first stage and the first tone conversion unit 205 for a second stage. In the third and fourth tone conversion units 202 and 203 for the first stage before integration is performed by the signal integration unit 204, regarding the above two types of RGB signals, it is ensured that the ratio of RGB after conversion does not deviate significantly, and is smaller than or equal to a predetermined level. Specifically, in the region indicated by reference numeral 500 in FIG. 11, tone conversion is performed according to a characteristic (conversion amount) that reduces the rise in a dark portion (low-luminance portion) to be lower than a characteristic that matches an inverse-characteristic 401 of the EOTF adapted for an HDR monitor. The input/output characteristic at this time is a characteristic indicated by reference numeral 402 in FIG. 11, for example. Note that, as described already, the characteristics of tone conversion in the third tone conversion unit 202 and the fourth tone conversion unit 203 may be common, or may be different within a range in which the difference in amplitude level between the two types of RGB signals after tone conversion is allowable. In addition, the characteristic indicated by reference numeral 402 in FIG. 11 is a curve, but may be a linear characteristic that amplifies an input value using a uniform gain. As an example thereof, a linear characteristic that connects an origin O and a point A in FIG. 11 can be used. Note that, as long as a conversion characteristic according to which the ratios of signal values of RGB signals are maintained before and after tone conversion is used, it is possible to suppress amplification of the difference in amplitude level between the two types of RGB signals, and thus exponential conversion may be performed besides linear conversion.

On the other hand, after integration was performed by the signal integration unit 204, the first tone conversion unit 205 performs tone conversion according to an input/output characteristic as shown in FIG. 12. The region indicated by reference numeral 500 corresponds to the region indicated by reference numeral 500 in FIG. 11. Regarding the output signal level of the region indicated by reference numeral 500 after tone conversion was performed by the third and fourth tone conversion units 202 and 203 for a first stage, the amplitude level is lower than that of the inverse-characteristic of an EOTF adapted for the HDR monitor. Therefore, in tone conversion that is performed by the first tone conversion unit 205, and is tone conversion of a second stage, tone conversion is performed so as to amplify the amplitude level that is reduced in tone conversion of a first stage.

Note that this tone conversion having two stages can be rephrased as tone conversion of relatively low non-linearity that is performed in a first stage before integration is performed by the signal integration unit 204, and tone conversion of relatively high non-linearity compared to the tone conversion of the first stage that is performed in a second stage after integration is performed by the signal integration unit 204. Those two stages are then combined, and tone conversion is performed so as to lastly achieve the inverse-characteristic of an EOTF adapted for an HDR monitor regarding low-frequency components.

Output of the first tone conversion unit 205 is input to the color-and-luminance separation unit 206. The color-and-luminance separation unit 206 separates a luminance signal Y (luminance signal component) and the chrominance signals U and V (chrominance signal components) from RGB signals that have been output from the first tone conversion unit 205, using Expressions 7 to 9.

In this embodiment, the band separation unit 210 separates high-frequency components from an input image according to a frequency amplitude characteristic as indicated by a curve 803 in FIG. 4. This characteristic includes the difference between a frequency amplitude characteristic that is desired to be achieved as a final luminance signal, and corresponds to the curve 801 in FIG. 10 and a frequency amplitude characteristic that is desired to be achieved as final chrominance signals, and corresponds to the curve 802 in FIG. 10. Note that, in FIGS. 3 and 4, N indicates a Nyquist frequency.

Note that high-frequency components separated by the band separation unit 210 are subjected to tone conversion that is performed by the second tone conversion unit 207 using Expressions 11 to 13, for example. Specifically, a gain f2(Yy) that serves as a conversion characteristic of tone conversion is determined by referencing a luminance Yy obtained from RGB signals R1y, G1y, and B1y, for luminance. Tone conversion is then performed by the second tone conversion unit 207 so as to adjust the amplitude level of high-frequency luminance signals Y_ac using the gain.

The high-frequency-component combining unit 208 combines output of the second tone conversion unit 207 with a luminance signal separated by the color-and-luminance separation unit 206, and the high-frequency-component combining unit 208 outputs a final luminance signal Y_out and chrominance signals U_out and V_out. In the high-frequency-component combining unit 208, calculations as in Expressions 14 to 16 are performed using the results of Expressions 7 to 9 and Expression 10.

Luminance signals and chrominance signals that are output from the high-frequency-component combining unit 208 are output from the external output terminal 113 via the image memory 106 or the codec unit 110, and are input to the HDR monitor.

As described above, also in the second embodiment, the frequency bands are separated when performing optimum image processing for luminance and optimum image processing for chrominance on a linear input image obtained by an image capturing unit. Regarding low-frequency components, the first tone conversion and third and fourth tone conversions are combined. In addition, the second tone conversion is applied to high-frequency components. Tone conversion of the inverse-characteristic of the EOTF adapted for an HDR monitor is then performed. Accordingly, without emphasizing, through tone conversion, false signals that are caused by the difference between signal processing for luminance and signal processing for chrominance, the luminance of a scene obtained by the image capturing unit can be regenerated as luminance on the HDR monitor.

Note that, in this embodiment, RGB is used as a color space for the first to fourth tone conversion units to perform tone conversion, but conversion processing may be performed using a color space of another color mixing system/color system such as XYZ or LMS.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-119885, filed Jun. 19, 2017, which is hereby incorporated by reference herein in its entirety.

What is claimed is:
1. An image processing apparatus comprising:
at least one processor or circuit configured to function as the following units:
a separation unit configured to separate a high-frequency component and a low-frequency component from an input image signal;
a first generation unit configured to generate a color signal component for a luminance signal from the low-frequency component;
a second generation unit configured to generate a color signal component for a chrominance signal from the low-frequency component;
a third generation unit configured to generate a color signal component used in common for a luminance signal and a chrominance signal by combining an output of the first generation unit and an output of the second generation unit;

a first tone conversion unit configured to perform first tone conversion processing on an output of the third generation unit;

a color-and-luminance separation unit configured to generate a luminance signal and a chrominance signal from a signal after being processed by the first tone conversion unit;

a second tone conversion unit configured to perform a second tone conversion on the high-frequency component; and a combining unit configured to combine an output of the color-and-luminance separation unit and an output of the second tone conversion unit.

2. The image processing apparatus according to claim 1, wherein a degree of amplification of an amplitude that is performed in a low-luminance portion of an input signal by the second tone conversion unit is lower than that by the first tone conversion unit.

3. The image processing apparatus according to claim 1, wherein the first tone conversion unit performs tone conversion of a relatively high non-linearity, and the second tone conversion unit performs tone conversion of a relatively low non-linearity compared with the first tone conversion unit.

4. The image processing apparatus according to claim 1, wherein the color signal component is constituted by RGB signal components.

5. The image processing apparatus according to claim 1, wherein the at least one processor or circuit is configured to further comprising function as:

a separation unit configured to separate color signal components that are output from the first tone conversion unit into a luminance signal component and chrominance signal components.

6. The image processing apparatus according to claim 1, wherein the image processing apparatus is an image processing apparatus that performs tone conversion on an input image signal such that a curve indicating a relationship between a signal level of an input image signal and a signal level of an output image signal matches a target curve aimed to be achieved, and the target curve is a curve representing an inverse-characteristic of an EOTF (Electro Optical Transfer Function) of a monitor corresponding to a high dynamic range.

7. An image processing apparatus comprising:

at least one processor or circuit configured to function as the following units:

a separation unit configured to separate a high-frequency component and a low-frequency component from an input image signal;

a first generation unit configured to generate a color signal component for a luminance signal from the low-frequency component;

a second generation unit configured to generate a color signal component for a chrominance signal from the low-frequency component;

a third tone conversion unit configured to perform third tone conversion processing on the color signal component for a luminance signal;

a fourth tone conversion unit configured to perform fourth tone conversion processing on the color signal component for a chrominance signal;

a third generation unit configured to generate a color signal component used in common for a luminance signal and a chrominance signal by combining an output of the third tone conversion unit and an output of the fourth tone conversion unit;

a first tone conversion unit configured to perform first tone conversion processing on an output of the third generation unit;

a color-and-luminance separation unit configured to generate a luminance signal and a chrominance signal from a signal after being processed by the first tone conversion unit;

a second tone conversion unit configured to perform a second tone conversion on the high-frequency component; and a combining unit configured to combine an output of the color-and-luminance separation unit and an output of the second tone conversion unit.

8. The image processing apparatus according to claim 7, wherein the third tone conversion unit and the fourth tone conversion unit perform tone conversions such that a difference in amplitude between a color signal component that is output from the third tone conversion unit and a color signal component that is output from the fourth tone conversion unit is smaller than or equal to a predetermined level.

9. The image processing apparatus according to claim 7, wherein a degree of amplification of an amplitude that is performed in a low-luminance portion of an input signal in a tone conversion characteristic acquired by the second tone conversion unit is lower than that in a tone conversion characteristic acquired by combining the first tone conversion processing and the third or fourth tone conversion processing.

10. The image processing apparatus according to claim 7, wherein the tone conversion characteristic acquired by combining the first tone conversion processing and the third or fourth tone conversion processing is a tone conversion characteristic of a relatively high non-linearity, and a tone conversion characteristic of the second tone conversion processing is a tone conversion characteristic of a relatively low non-linearity compared with the tone conversion characteristic acquired by combining the first tone conversion processing and the third or fourth tone conversion processing.

11. The image processing apparatus according to claim 7, wherein the third tone conversion unit and the fourth tone conversion unit perform tone conversion of a same characteristic.

12. The image processing apparatus according to claim 7, wherein tone conversion that is performed by the third and fourth tone conversion units includes a tone conversion in which a curve indicating a relationship between a signal level of an input signal and a signal level of an output signal is a straight line.

13. The image processing apparatus according to claim 7, wherein the image processing apparatus is an image processing apparatus that performs a tone conversion on an input image signal such that a curve indicating a relationship between a signal level of an input image signal and a signal level of an output image signal matches a target curve aimed to be achieved, and the third and fourth tone conversion units perform a tone conversion so as to have a conversion amount smaller than a conversion amount that is set such that a curve indicating a relationship between a signal level of a low-frequency component of the input image signal and a signal level of a low-frequency component of an output image signal matches the target curve, and the first tone conversion unit performs a tone conversion so as to have a conversion amount corresponding to a difference from the target curve that remains after the third and fourth tone conversion units performed the tone conversion.

14. The image processing apparatus according to claim 13, wherein the target curve is a curve representing an inverse-characteristic of an EOTF (Electro Optical Transfer Function) of a monitor adapted for a high dynamic range.

15. The image processing apparatus according to claim 7, wherein the color signal component is constituted by RGB signal components.

16. The image processing apparatus according to claim 7, wherein the at least one processor or circuit is configured to further comprising function as:
a separation unit configured to separate a color signal component that is output from the first tone conversion unit into a luminance signal component and chrominance signal components.

17. An image processing method comprising:
separating a high-frequency component and a low-frequency component from an input image signal;
executing a first generation for generating a color signal component for a luminance signal from the low-frequency component;
executing a second generation for generating a color signal component for a chrominance signal from the low-frequency component;
executing a third generation for generating a color signal component used in common for a luminance signal and a chrominance signal by combining an output of the first generation and an output of the second generation;
performing a first tone conversion on an output of the third generation;
executing color-and-luminance separation for generating a luminance signal and a chrominance signal from a signal after being processed in the first tone conversion;
performing a second tone conversion on the high-frequency component; and
combining an output of the color-and-luminance separation and an output of the second tone conversion.

18. An image processing method comprising:
separating a high-frequency component and a low-frequency component from an input image signal;
executing a first generation for generating a color signal component for a luminance signal from the low-frequency component;
executing a second generation for generating a color signal component for a chrominance signal from the low-frequency component;
performing a third tone conversion on the color signal component for a luminance signal;
performing a fourth tone conversion on the color signal component for a chrominance signal;
executing a third generation for generating a color signal component used in common for a luminance signal and a chrominance signal by combining an output of the third tone conversion and an output of the fourth tone conversion;
performing first tone conversion processing on an output of the third generation;
executing color-and-luminance separation for generating a luminance signal and a chrominance signal from a signal after being processed in the first tone conversion;
performing a second tone conversion on the high-frequency component; and
combining an output of the color-and-luminance separation and an output of the second tone conversion.

19. A non-transitory computer-readable storage medium that stores a program for causing a computer to execute steps of an image processing method, the image processing method comprising:
separating a high-frequency component and a low-frequency component from an input image signal;
executing a first generation for generating a color signal component for a luminance signal from the low-frequency component;
executing a second generation for generating a color signal component for a chrominance signal from the low-frequency component;
executing a third generation for generating a color signal component used in common for a luminance signal and a chrominance signal by combining an output of the first generation and an output of the second generation;
performing a first tone conversion on an output of the third generation;
executing color-and-luminance separation for generating a luminance signal and a chrominance signal from a signal after being processed in the first tone conversion;
performing a second tone conversion on the high-frequency component; and
combining an output of the color-and-luminance separation and an output of the second tone conversion.

20. A non-transitory computer-readable storage medium that stores a program for causing a computer to execute steps of an image processing method, the image processing method comprising:
separating a high-frequency component and a low-frequency component from an input image signal;
executing a first generation for generating a color signal component for a luminance signal from the low-frequency component;
executing a second generation for generating a color signal component for a chrominance signal from the low-frequency component;
performing a third tone conversion on the color signal component for a luminance signal;
performing a fourth tone conversion on the color signal component for a chrominance signal;
executing a third generation for generating a color signal component used in common for a luminance signal and a chrominance signal by combining an output of the third tone conversion and an output of the fourth tone conversion;
performing a first tone conversion on an output of the third generation;
executing color-and-luminance separation for generating a luminance signal and a chrominance signal from a signal after being processed in the first tone conversion;
performing a second tone conversion on the high-frequency component; and
combining an output of the color-and-luminance separation and an output of the second tone conversion.

* * * * *